(12) United States Patent
Nowson et al.

(10) Patent No.: US 10,025,775 B2
(45) Date of Patent: Jul. 17, 2018

(54) EMOTION, MOOD AND PERSONALITY INFERENCE IN REAL-TIME ENVIRONMENTS

(71) Applicant: CONDUENT BUSINESS SERVICES, LLC, Dallas, TX (US)

(72) Inventors: Scott P. Nowson, Grenoble (FR); Julien J. Perez, Grenoble (FR)

(73) Assignee: Conduent Business Services, LLC, Dallas, TX (US)

(*) Notice: Subject to any disclaimer, the term of this patent is extended or adjusted under 35 U.S.C. 154(b) by 12 days.

(21) Appl. No.: 14/845,528

(22) Filed: Sep. 4, 2015

(65) Prior Publication Data
US 2017/0069340 A1 Mar. 9, 2017

(51) Int. Cl.
*G06F 17/27* (2006.01)
*G10L 15/18* (2013.01)

(52) U.S. Cl.
CPC ...... *G06F 17/2785* (2013.01); *G10L 15/1822* (2013.01)

(58) Field of Classification Search
CPC .................. G06F 17/2785; G10L 15/1822
See application file for complete search history.

(56) References Cited

U.S. PATENT DOCUMENTS

| | | | |
|---|---|---|---|
| 5,987,415 A * | 11/1999 | Breese .................... | G10L 17/26 704/270 |
| 6,185,534 B1 | 2/2001 | Breese et al. | |
| 6,526,395 B1 | 2/2003 | Morris | |
| 6,728,679 B1 | 4/2004 | Strubbe et al. | |
| 6,731,307 B1 * | 5/2004 | Strubbe .................. | G06N 3/004 704/E17.002 |
| 2002/0194002 A1 * | 12/2002 | Petrushin ................ | G10L 17/26 704/270 |
| 2006/0262920 A1 * | 11/2006 | Conway et al. ..... | G10L 15/1822 379/265.02 |
| 2007/0071206 A1 * | 3/2007 | Gainsboro .......... | H04M 3/2281 379/168 |
| 2008/0096533 A1 | 4/2008 | Manfredi et al. | |
| 2011/0004577 A1 | 1/2011 | Jung et al. | |

(Continued)

OTHER PUBLICATIONS

Z. Callejas et al., Predicting user mental states in spoken dialogue systems, EURASIP Journal on Advances in Signal Processing 6., 2011, 1-21.

(Continued)

*Primary Examiner* — Walter Yehl
(74) *Attorney, Agent, or Firm* — Gibb & Riley, LLC

(57) ABSTRACT

Methods and systems monitor communications between users and analyze the communications to simultaneously determine, for a current time period, mental state variables of one of the users. Such mental state variables include the emotion of the user, the mood of the user, and the personality of the user. Additionally, such methods aggregate the emotion, the mood, and the personality using a hierarchical probabilistic graphical model that determines the highest probability path through a directed probabilistic graph to infer the mental state of the user. The directed probabilistic graph maintains a single state for the personality for the time period, and maintains multiple states for the emotion and the mood for the time period. These methods and systems output the mental state of the user.

18 Claims, 9 Drawing Sheets

(56) References Cited

U.S. PATENT DOCUMENTS

| | | | |
|---|---|---|---|
| 2013/0173264 A1* | 7/2013 | Kiss | G10L 17/26 |
| | | | 704/231 |
| 2016/0098480 A1* | 4/2016 | Nowson | G06F 17/2785 |
| | | | 707/738 |
| 2016/0227036 A1* | 8/2016 | Warford | H04M 3/5175 |

OTHER PUBLICATIONS

Fabio Celli et al., Workshop on Computational Personality Recognition: Shard Task, In proceedings of the Workshop on Computational Personality Recognition, 2014, 1-5.

L. Coviello et al., Detecting Emotional Contagion in Massive Social Networks. PLoS One 9(3), (2014), 1-6.

D. J. Schneider, Implicit personality theory: A review. Psychological Bulletin (1973), 79(5) 294-309 (Abstract).

B. Ferwerda et al., Enhancing Music Recommender Systems with Personality Information and Emotional States: A Proposal, Proceedings of the 2nd Workshop Emotions and Personality in Personalized Services, (2014), 1-9.

W.K. Hastings, "Monte Carlo Sampling Methods Using Markov Chains and Their Applications". Biometrika (1970). 57 (1): 97-109.

F. Mairesse et al., Using Linguistic Cues for the Automatic Recognition of Personality in Conversation and Text, Journal of Artificial Intelligence Research (JAIR),(2007),R.30, 457-500.

G. Matthews et al., Personality traits, Third Edition,Cambridge University Press (1998), pp. 1-30.

R.R. McCrae et al., An Introduction to the Five-Factor Model and its Applications, Journal of Personality (1992), vol. 60, 175-215.

M. R. Mehl et al., Personality in Its Natural Habitat: Manifestations and Implicit Folk Theories of Personality in Daily Life, Journal of Personality and Social Psychology, (2006) vol. 90 No. 5, 862-877.

N. Metropolis et al., Equations of State Calculations by Fast Computing Machines, (1953), Journal of Chemical Physics 21 (6): 1087-1092.

S. Mohammad et al., Using Nuances of Emotion to Identify Personality, (2013), In Proceedings of the Workshop on Computational Personality Recognition 2013, 1-5.

R.M. Neal, An Improved Acceptance Procedure for the Hybrid Monte Carlo Algorithm, (Jul. 1992), Department of Computer Science, 1-16.

R.M. Neal et al., MCMC Hamiltonian dynamics, (2010), In the Handbook of Markov Chain Monte Carlo, S. Brooks, A. Gelman, G. L. Jones, and X.-L. Meng (editors), Chapman & Hall / CRC Press,113-162.

A. Ortony et al., A. The Cognitive Structure of Emotions, Cambridge University Press, (1998), 1-26.

J. Pittermann et al., Emotion Recognition and Adaptation in Spoken Dialogue Systems, (2010), International Journal of Speech Technology, vol. 13, Issue 1, pp. 49-60 (Abstract).

S.C. Roberts, Who Punishes? Personality Traits Predict Individual Variation in Punitive Sentiment. Evolutionary Psychology, (2013), 11(1) 186-200.

Tsang-Long Pao et al., Emotion Recognition via Continuous Mandarin Speech, (2008), Advances in Human Computer Interaction, www.intechopen.com, 365-385.

J. Vuoskoski et al., Emotions Represented and Induced by Music, The The Role of Individual Differences (2012). Jyväskylä Studies in Humanities, 174, pp. 15-16 & 18-20.

* cited by examiner

| | DESCRIPTION | MODEL | TEMPORAL STABILITY |
|---|---|---|---|
| PERSONALITY | TYPICALLY CONSIDERED AS SET OF CHARACTERISTICS POSSESSED BY A PERSON THAT UNIQUELY INFLUENCES THEIR BEHAVIOUR, MODERATED BY CONTEXT. | FIVE FACTOR MODEL (FFM) OF NEUROTICISM, EXTRAVERSION, OPENNESS TO EXPERIENCE, AGREEABLENESS, AND CONSCIENTIOUSNESS | STABLE |
| MOOD | A LESS SPECIFIC AND LESS INTENSE SUBJECTIVE STATE OF MIND THAN EMOTIONS (SEE BELOW) THOUGH TYPICALLY MORE PROLONGED. | VARIOUS MODELS CALCULATE MOOD USING THREE STATES POSITIVE/GOOD, NEUTRAL, AND NEGATIVE/BAD. | SHORT- MID TERM |
| EMOTION | A SUBJECTIVE STATE OF MIND EXPERIENCED BY AN INDIVIDUAL, MOST OFTEN TRIGGERED BY A SPECIFIC EVENT, WHICH EXPRESSES ITSELF IN MANY PSYCHO PHYSIOLOGICAL WAYS. | THE OCC MODEL (ORTONY, CLORE AND COLLINS,) DEFINES 22 CATEGORIES INCLUDING HAPPY - FOR, SATISFACTION, ANGER, DISTRESS. THESE CAN BE MAPPED TO 6 HIGH - ORDER, UNIVERSALLY RECOGNIZED CATEGORIES. | INSTANTANEOUS |

EMOTION, MOOD AND PERSONALITY INFERENCE IN REAL-TIME ENVIRONMENTS

BACKGROUND

Systems and methods herein generally relate to using specialized machines to monitor communications between users, and processes that output and constantly revise the mental state of one or more of the users.

The issue of customer modeling (e.g., understanding who a customer is) is fundamental to any notion of personalization and is an issue particularly with Virtual Agent processes. For successful communication, a useful component of the customer to model is their mental state: their personality, mood, and emotions.

SUMMARY

Exemplary methods herein automatically monitor text and/or speech communications between users using a specialized language processor, and automatically analyze the communications using the specialized language processor to simultaneously determine, for a current time period, mental state variables of a user. These mental state variables can include, for example, the emotion of the user, the mood of the user and the personality of the user. The method then automatically aggregates the emotion, mood, and personality using a hierarchical probabilistic graphical model to determine the highest probability path through a directed probabilistic graph to infer the mental state of the user. Using the specialized language processor, the method outputs the mental state of the user from the specialized language processor by displaying the emotion, mood, and personality on the graphic user interface of the processor, or outputting the mental state to a different process.

The directed probabilistic graph maintains a single state for personality for the time period, and maintains multiple states for the emotion and the mood for the time period. Therefore, this directed probabilistic graph has a single personality node, multiple mood nodes, multiple emotion nodes, and multiple evidence nodes. The directed probabilistic graph has edges connecting the personality node, the mood nodes, the emotion nodes, and the evidence nodes; and the edges themselves have probability values. The method processes a path through the directed probabilistic graph, and the probability of the path is formed from an aggregation of the probabilities of the edges of the series of adjacent nodes. The highest probability path has an aggregation of the probabilities of the edges that is higher than all other possible paths through the directed probabilistic graph.

Each of the mood nodes, the emotion nodes, and the evidence nodes are for a different time portion of the time period. The evidence nodes can include different dialogue variables used by the personality node, the mood nodes, and the emotion nodes. The emotion nodes can be, for example, happy-for, satisfaction, anger, or distressed states; the mood nodes can be, for example, positive, neutral, or negative, and the personality nodes can be, for example, neuroticism, extraversion, openness to experience, agreeableness, or conscientiousness.

Exemplary systems herein include a specialized language processor and any form of interface (e.g., a graphic user interface) connected to the specialized language processor. The specialized language processor automatically monitors text communications between users, and the specialized language processor automatically analyzes the text communications to simultaneously determine, for a current time period, the mental state variables of a user. These mental state variables include the emotion, personality and mood of the user. The specialized language processor automatically aggregates the emotion, mood, and personality using a hierarchical probabilistic graphical model that determines the highest probability path through the graph to infer the mental state of the user. The graphic user interface then outputs the mental state of the user from the specialized language processor, for example by displaying the emotion, mood, and personality status or by outputting the mental state to a different process.

The directed probabilistic graph maintains a single state for personality for the time period, and maintains multiple states for the emotion and the mood during the same time period. Therefore, the directed probabilistic graph described above includes a single personality node, multiple mood nodes, multiple emotion nodes, and multiple evidence nodes. The edges of the directed probabilistic graph connect the personality node, the mood nodes, the emotion nodes, and the evidence nodes and the edges contain probability values. A path through the directed probabilistic graph is made of a series of adjacent nodes, and the probability of the path is determined by an aggregation of the probabilities of the edges of the series of adjacent nodes. Thus, the highest probability path has an aggregation of the probabilities of the edges that is higher than all other possible paths through the graph.

Furthermore, each of the mood nodes, emotion nodes, and evidence nodes is for a different time portion of the time period and the evidence nodes include different dialogue variables used by the personality node, mood nodes, and emotion nodes. The emotion variables include, for example, happy-for-satisfaction, anger, or distress, mood variables include, for example, positive, neutral, or negative, and the personality variables include, for example neuroticism, extraversion, and openness to experience, agreeableness, or conscientiousness. These and other features are described in, or are apparent from, the following detailed description.

BRIEF DESCRIPTION OF THE DRAWINGS

Various exemplary systems and methods are described in detail below, with reference to the attached drawing figures, in which:

FIG. 1 is a table diagram illustrating methods herein;

DETAILED DESCRIPTION

Figure 2:
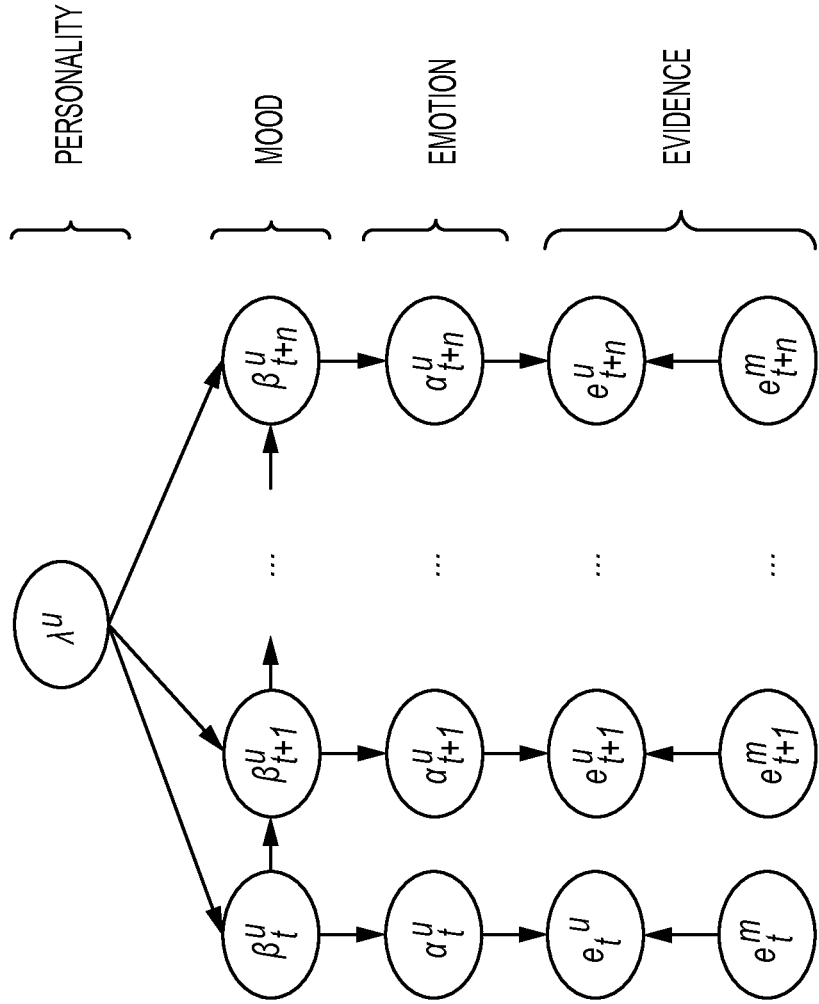
FIG. 2 is a hierarchical probabilistic graphical model of various methods herein.

As mentioned above, one advance of customer modeling is to understand who the individual customer is; and the systems and methods herein provide a probabilistic approach to tracking the mental state of the customer at each of three levels (e.g., personality, mood and emotion) during a sequential set of turns that compose a conversation. This can be done on a number of levels from external (e.g., the products/services that they own and use) through personal demographics (e.g., location, age, gender) to internal mental states and beliefs (e.g., personality, sentiment).

As humans make an impression on one another, they wish to automatically determine the personality of a customer. Personality traits are generally considered temporally stable, and thus this disclosure's modeling ability is enriched by the acquisition of more data over time.

Further, an individual's mood and emotions will cloud the ability to determine personality. Indeed, implicit personality theory considers that there are many factors that affect the impressions one forms of people, including mood. The systems and methods described herein provide an approach that enables a user to statistically infer mental states at several levels of temporal stability. For purposes herein the "mental state" includes three distinct, yet connected levels: personality, mood and emotion. More specifically, the systems and methods herein infer the three levels by hierarchically connecting models together in a coherent probabilistic graphical model (PGM). The systems and methods herein provide a formal PGM that infers an individual's mental states (the latent variables) at the personality, mood and emotion levels from evidence (observed variables).

The systems and methods apply this PGM in a temporally dynamic situation: namely conversational dialogue data. In practice, this data could be drawn from a direct 1-on-1 dialogue (for example a web chat) or an asynchronous series of communications via social media (e.g., a forum thread). The important considerations with the data are such that; there is a conversational partner(s) who provide external utterances to the individual which could affect their mental state. The communication is relatively time-bound such that it is realistic to infer a connection between short-term emotional states.

Firstly, the systems and methods herein present a dynamic and hierarchical mental state model. One broad concept herein is to aggregate in a hierarchical probabilistic framework several approaches to mental state modeling and specifying the necessary conditional dependencies between them. In the second part, the systems and methods address the inference procedure associated with the model. Thus, as shown in the table 100 in FIG. 1, when considering personality, mood, and emotion various observations can be made. The description of a user's personality is typically considered as set of characteristics possessed by a person that uniquely influences their behavior, moderated by context. While many models can be used to determine personality with systems and methods herein, one exemplary model is the Five Factor Model (FFM) of neuroticism, extraversion, openness to experience, agreeableness, and conscientiousness. Further, as shown in FIG. 1, for purposes herein, the personality is considered to be stable with respect to temporal stability.

As also shown in FIG. 1, the description of a user's mood is a less specific and less intense subjective state of mind than emotions, though typically more prolonged. Various models calculate mood with systems and methods herein using three states positive/good, neutral, and negative/bad. Further, as shown in FIG. 1, for purposes herein, the mood is considered to be short-midterm with respect to temporal stability.

FIG. 1 also shows that the description of a user's emotion is a subjective state of mind experienced by an individual, most often triggered by a specific event, which expresses itself in many psycho-physiological ways. While many models can be used to determine personality with systems and methods herein, one exemplary model is the OCC model (Ortony, Clore and Collins,) defines 22 categories including happy-for, satisfaction, anger, distress. These can be mapped to 6 high-order, universally recognized categories.

FIG. 2 illustrates the Dynamic and Hierarchical Mental State Model (DHMSM) 102 that the systems and methods provide in order to infer hidden mental state variables from dialogue data with T turns of utterances exchanged. In the model, dialogue variables are defined and referred to as evidence. In this directed probabilistic graphical model, the observed variables are shaded and the hidden variables that are inferred are blanked.

As shown in FIG. 2, the permanent aspect of the personality of a considered user u is defined by a random variable $\lambda^u$ drawn from, for example, a Dirichlet distribution of parameter $\theta_\lambda \in \mathbb{R}^5$. The dimensionality of size 5 of this variable, in this instance, aims at modeling the so-called Five Factor Model of personality; neuroticism, extraversion, openness, agreeableness and conscientiousness referenced in FIG. 1; however, those skilled in the art would understand that different personality models could have different dimensionalities. For a given user, though the degree of personality can vary with context, this variable is considered stable through the time of the interactions of a given dialog.

Further, in FIG. 2, the mood $\beta^u$ is modeled as a temporal type of random variable representing the 3 exemplary cardinal moods; good, neutral and bad drawn from a multinomial distribution of parameter $\theta_\beta \in \mathbb{R}^3$. This example uses a Markovian dependency between the overall personality variable $\lambda^u$, a mood state at time t, $\beta_t^u$ and the previous mood state at time t−1, $\beta_{t-1}^u$; although those skilled in the art would understand that other known dependencies could be used with systems and methods herein. Thus, FIG. 2 illustrates that that mood change is a phenomena conditioned by the past state of the variable but also the personality type of the user. For example, high scorers of neuroticism are more prone to negative moods and dramatic mood changes than low scorers.

Then, as further shown in FIG. 2, the instantaneous emotion state $\alpha^u$ is a random variable drawn from a multinomial distribution of parameter $\theta_\alpha \in \mathbb{R}^6$ that aims at representing six exemplary high level emotional states; hope, fear, relief, satisfaction, joy and distress (while those skilled in the art would understand that other emotional states could be used by systems and methods herein). Note that this could be extended to the full OCC model by using the parameter distribution $\theta_\alpha \in \mathbb{R}^{22}$.

Additionally, in FIG. 2, $e^u$ and $e^m$ are respectively the evidences produced by the user u and the dialogue partner m. The evidence is something that is written by a user, something that is said by a user, something in the voice signal of the user, etc. In this model, the partner could be either a human interlocutor, or a system producing automated responses. These evidential variables can be decomposed to linguistic and statistical features including, but not limited to, those such as; bag-of-word ngrams, part-of-speech tags and parse tree features, dialogue acts associated to each utterance, message length, time of response, frequency of multiple utterances in the same turn, number of messages of a given turn, etc.

In this example, the partner m holds the initiative of the dialogue such that each observed utterance produced by the user u is statistically conditioned by both the current instantaneous emotional state and the last utterance of the dialogue partner $e_t^m$. See equation (1) below;

$$p(\lambda^u, \beta^u_{1:T}, \alpha^u_{1:T}, e^u_{1:T}, e^m_{1:T}) = p(\lambda^u)p(\beta^u_1|\lambda^u)\Pi_{t=2}^T p(\beta^u_t|\lambda^u, \beta^u_{t-1})\Pi_{t=1}^T p(\alpha^u_t|\beta^u_t)\Pi_{t=1}^T p(e^u_t|e^m_t, \alpha^u_t)p(e^m_t).$$

Equation (1) (above) defines the closed form expression of the joint probability of the graphical model of the systems and method herein. During the inference phase (see below) the parameters of the mental state model $\{\lambda^u, \beta^u_{1:T}, \alpha^u_{1:T}\}$ are inferred with respect to the observed variables $\{e^u_{1:T}, e^m_{1:T}\}$ (the evidence utterances and derived features) as expressed in Equation (2) (see below), which defines the corresponding maximum a posteriori query:

$$\operatorname*{argmax}_{\lambda^u, \beta^u_{1:T}, \alpha^u_{1:T}} p(\lambda^u, \beta^u_{1:T}, \alpha^u_{1:T} \mid e^u_{1:T}, e^m_{1:T}) =$$

$$\frac{p(e^u_{1:T}, e^m_{1:T} \mid \lambda^u, \beta^u_{1:T}, \alpha^u_{1:T})p(\lambda^u, \beta^u_{1:T}, \alpha^u_{1:T})}{p(e^u_{1:T}, e^m_{1:T})} \propto$$

$$p(e^u_{1:T}, e^m_{1:T} \mid \lambda^u, \beta^u_{1:T}, \alpha^u_{1:T})p(\lambda^u, \beta^u_{1:T}, \alpha^u_{1:T}).$$

According to Equation (2), two situations can be considered. Starting with a uniform, i.e., non-informative, prior over the marginal distribution of the parameters $p(\lambda^u, \beta^u_{1:T}, \alpha^u_{1:T})$. Alternatively, it can be assumed that a given prior distribution of these variables, for a specific user u, has already been inferred in a previous dialogue session analysis or by any other means. Concerning the second part of the equation, the likelihood of the evidence with respect to the model's parameters $p(e^u_{1:T}, e^m_{1:T}|\lambda^u, \beta^u_{1:T}, \alpha^u_{1:T})$ will be maximized by, for example, Monte Carlo Markov Chain sampling.

Thus, with the systems and methods herein, the task of inferring the parameters of the model from data is also called learning. In this context, one can assume the existence of an annotated corpus of dialogues where each level of the hierarchical model, $\alpha^u$ and $\beta^u$, is informed at each turn. Concerning $\lambda^u$, the variable is informed at the level of each dialogue. In fact, the computational challenge in latent variable modeling is to compute the posterior distribution of the latent variables conditioned by available observations. Except in rudimentary models, exact posterior inference is known to be intractable and practical data analysis relies on efficient approximate alternatives.

As noted above, in one example the systems and methods can apply a Markov Chain Monte Carlo (MCMC) as a general technique for parameter inference in graphical models. MCMC sampling is the most widely used method of approximate inference. The idea behind MCMC is to approximate a distribution by forming an empirical estimate from samples. One can construct a Markov chain with the appropriate stationary distribution, and collect the samples from a chain that has converged. One exemplary process used with the systems and methods herein of a MCMC process is the Gibbs sampler, in which the Markov chain is defined by iteratively sampling, in a sweep manner, each variable conditional on previously sampled values of the other variables. This is a form of the Metropolis-Hastings process, and thus yields a chain with the desired stationary distribution. In this modeling mentioned in the previous paragraph, every variable is sampled according to each corresponding distribution.

Finally, the proposed generative model can also be used in a prior knowledge equipped setting. Indeed, assuming a customer can be identified through-out a series of dialogues, it will be possible to set an informative prior on the $\lambda^u$ parameter of the model.

Humans are very good at forming impressions of one another's personality and mood. However, in a text-based chat dialogue, there is minimal extra-linguistic information (e.g., voice, facial expressions, body language) upon which one can form an impression. One embodiment of the systems and methods is as part of an interface to support a human agent in understanding who their customer is (in this example case, in terms of personality and mood).

Figure 3:
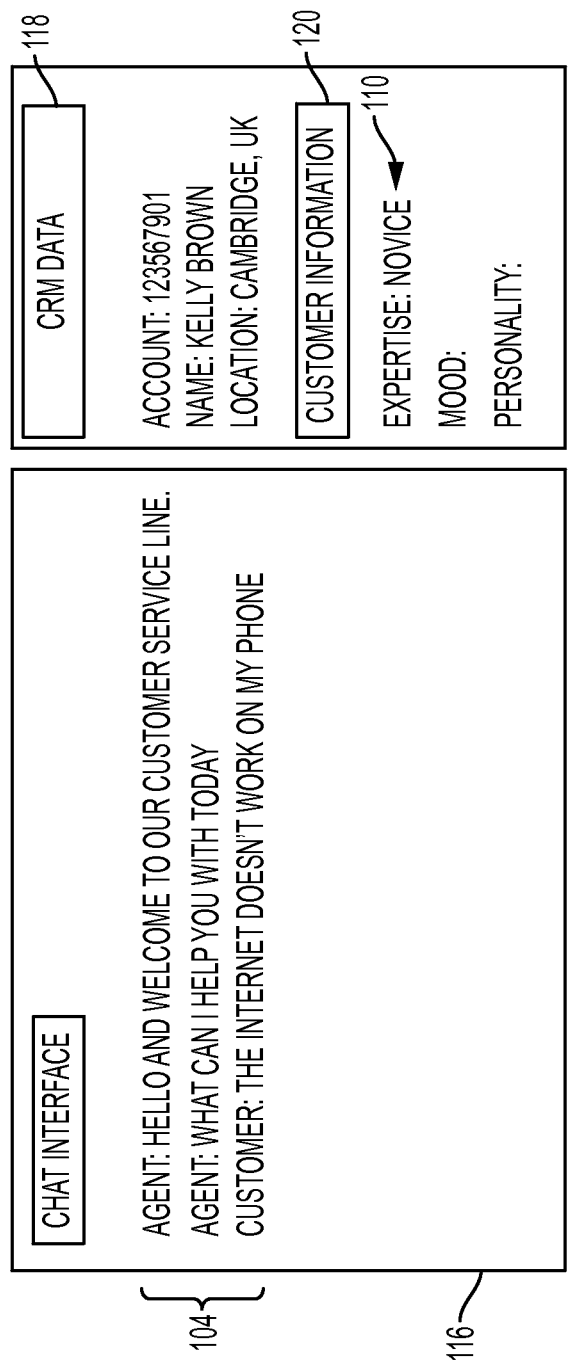
FIG. 3 is a schematic diagram illustrating output produced by systems and methods herein.
Figure 4:
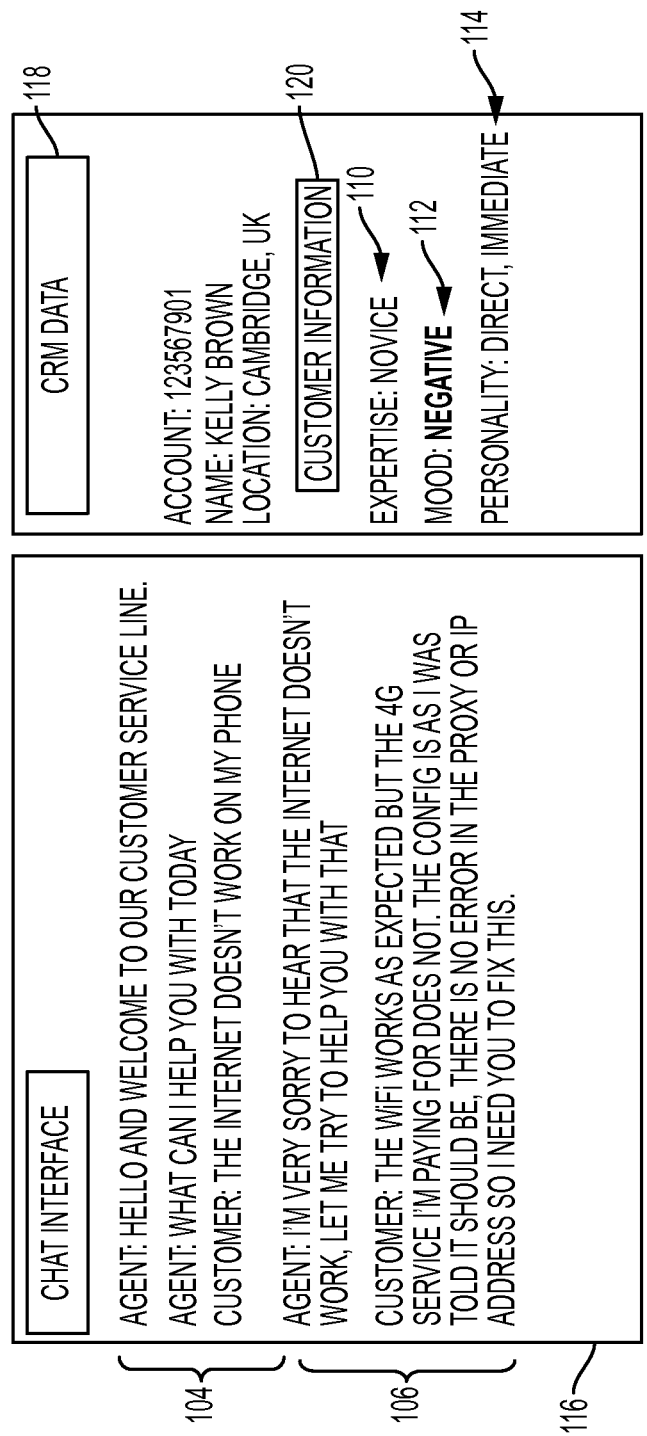
FIG. 4 is a schematic diagram illustrating output produced by systems and methods herein.
Figure 5:
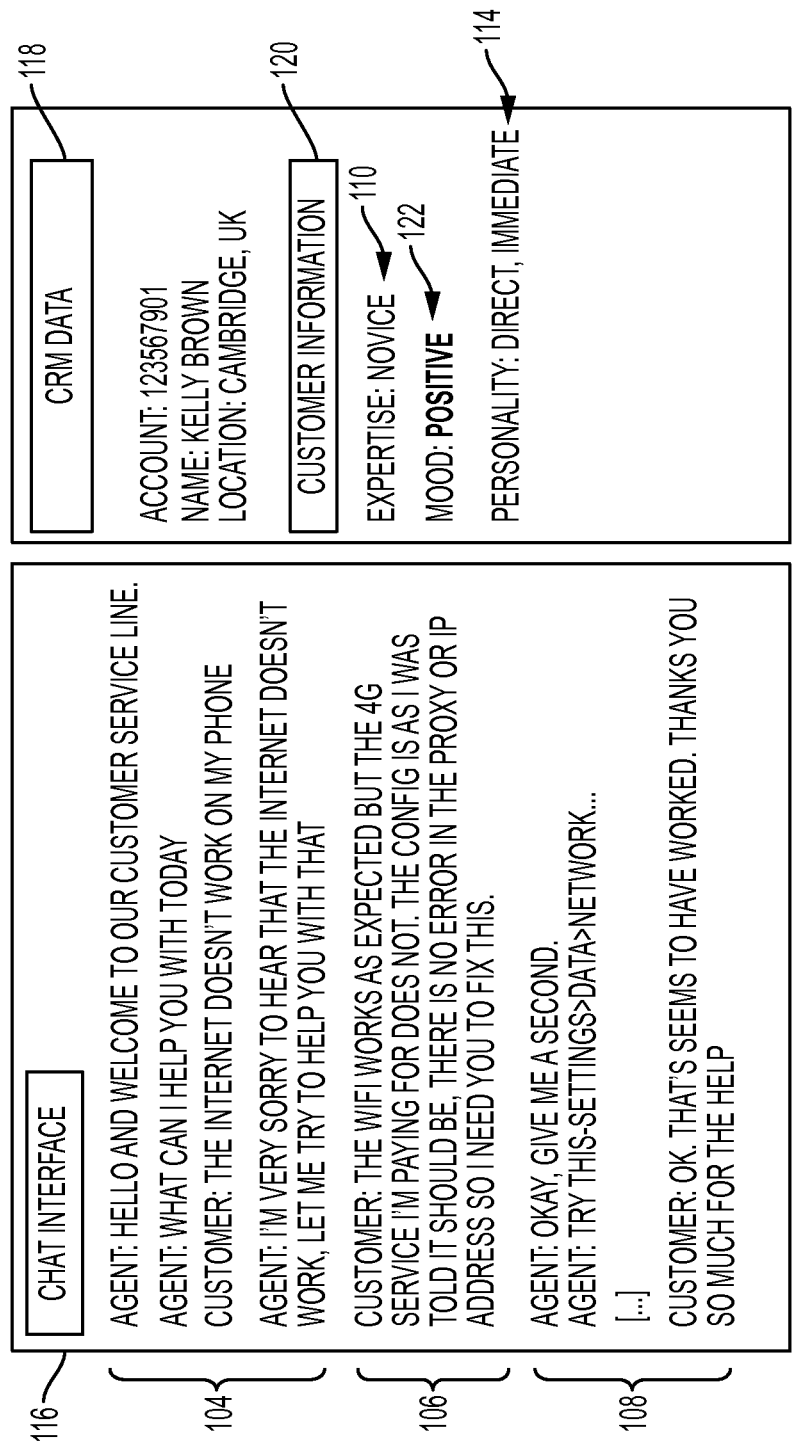
FIG. 5 is a schematic diagram illustrating output produced by systems and methods herein.

This is shown in an example presented in FIGS. 3-5. In FIG. 3, an example chat interface (item 116) is shown between users, in this case an agent and a customer. The chat interface also includes additional boxes depicting the CRM (customer resource management) data as shown in item 118 and the customer information shown in item 120.

More specifically, in the dialogue shown in item 104, the agent states to the customer "Hello and welcome to our customer service line. What can I help you with today." These statements can be manually generated by a human agent or automatically generated by a virtual (computer generated) agent. The customer responds "The internet doesn't work on my phone." From the vagueness of this statement, the related methods determine that the customer has an expertise level of "novice" as shown in item 110.

With the emotional state tracking ability of this system and method, the assessment of the customer will change over time. For example, in the interaction shown in FIG. 3 there is not enough information in the opening turn of the dialogue (as seen in the dialogue text in item 104) to make any determination of mood or personality (nor is there any prior knowledge of the personality of this customer). However, again, the customer information section in item 120, is able to determine using the dialogue in item 104, that in this example, the customer is a novice in regards to the technology, as shown by item 110.

However, as the dialogue progresses, the systems and methods track the mental state of the customer and update the reporting. This can be seen in FIG. 4, where the additional dialogue between the two users (item 106) has enabled the systems and methods to determine the mood and personality of the customer, as seen in items 112 and 114. More specifically, the virtual or real agent states: "I'm very sorry to hear that the internet doesn't work, let me try to help you with that"; and the customer responds with a very negative statement: "The wifi works as expected but the 4G service I'm paying for does not. The config is as I was told it should be. There is no error in the proxy or IP address so I need you to fix this." Because of the very negative statement of the customer, the systems and methods herein automatically determine that the customer's mood is "negative" and display the same in the customer information section 120, shown in FIG. 4 as item 112. In addition, the systems and methods herein analyze the customer's response 106 and automatically determine that the customer's personality is "direct, immediate" as shown by item 114 in FIG. 4.

As shown in FIG. 5, the third turn in the dialogue 108 includes the virtual or real agent stating "Okay, give me a second. Try this—Settings>Data>Network . . . " and the customer happily responds:"OK, that's seems to have worked. Thank you so much for the help." Because of the positive statement of the customer in 108, the systems and methods herein automatically determine that the customer's mood is "positive" and display the same in the customer information section 120, shown in FIG. 4 as item 122.

Thus, as shown in the example in FIGS. 3-5, the models used by the systems and methods herein are able to determine that though the personality 114 is stable, the mood of the customer changes from 112 to 122 with the resolution of the dialogue as can be seen in FIGS. 4 and 5. The systems and methods again use the additional dialogue between the two users, shown in item 108, to update the mental state variables of the customer. In addition to having solved the issue of the customer, the inferred change in their mood from negative to positive, as shown in item 112 and 122, can be seen as a secondary successful outcome of the interaction.

Figure 6:
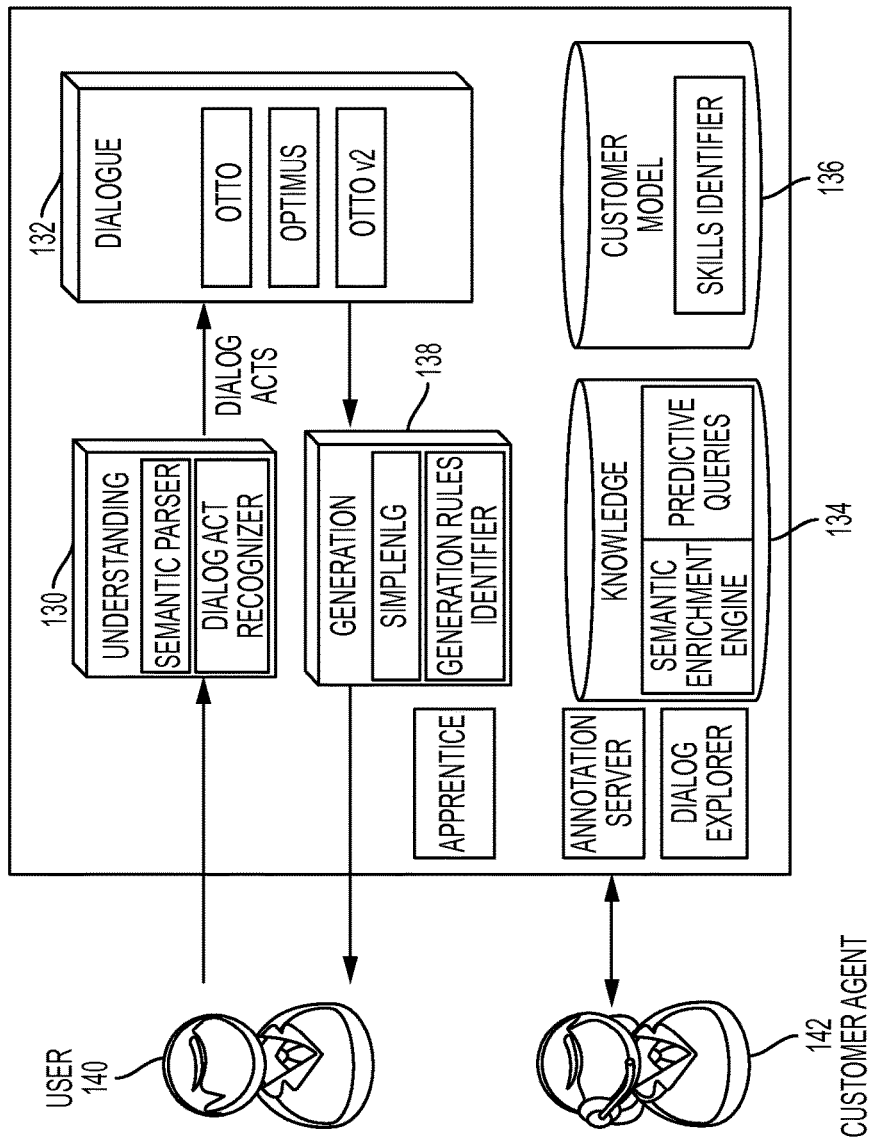
FIG. 6 is a schematic diagram illustrating a system herein.

Customer modeling is a component of various automation projects. As shown in FIG. 6, using the systems and methods described herein, the customer models are an observer of the dialogue between the human customer 140 and the agent (VA) 142. Note that agent 142 is not necessarily a virtual agent, and could be a human agent who can interact with the system for other reasons. In one example, the virtual agent could be the combination of 130, 132 and 138. Also, element 134 could be included in the virtual agent in some situations. The systems and methods herein replicate human impression formation for the agent 142, allowing the agent 142 to adapt to an increasing understanding of the personality and mood of the customer 140. By knowing the mental state parameters of the customer 140, the systems and methods herein bias the selection of the dialogue act in the dialogue manager 132. Similarly, to the systems and methods herein impact the surface realization (e.g. the choice of words) in the natural language generation component 138 of the agent 142.

For example, in FIG. 6, input from the user 140 generates understanding output from the understanding model in item 130, using semantic parser and dialog act recognizer elements. The understanding model 130 feeds the output into the dialogue manager 132, which can include exemplary modules Otto, Optimus, Otto v2, etc., and which provides output to the generation model 138 (e.g., using a SimpleNLG model and generation rules identifier). A knowledge base is also used, as shown in item 134, which includes a semantic enrichment engine and predictive queries. A customer model 136 is also used which includes a skills identifier. The customer agent 142 in FIG. 6 can also use various tools such as an apprentice module, annotation server, and dialog explorer.

Thus, the systems and methods herein provide the ability to understand customers at a psychological level, and can be utilized in a number of ways on various social media platforms. For example, the systems and methods herein can be used in outward engagement and can help understand which customers are most likely open to receiving a targeted marketing campaign. The systems and methods herein also can be used to determine when a targeted marketing campaign would be appropriate based on mood of the customer. At the same time, the systems and methods are able to personalize the campaign in such a way that it resonates in the best way with different types of customers. The systems and methods herein also can be used to provide personalized product/service recommendations.

Figure 7:
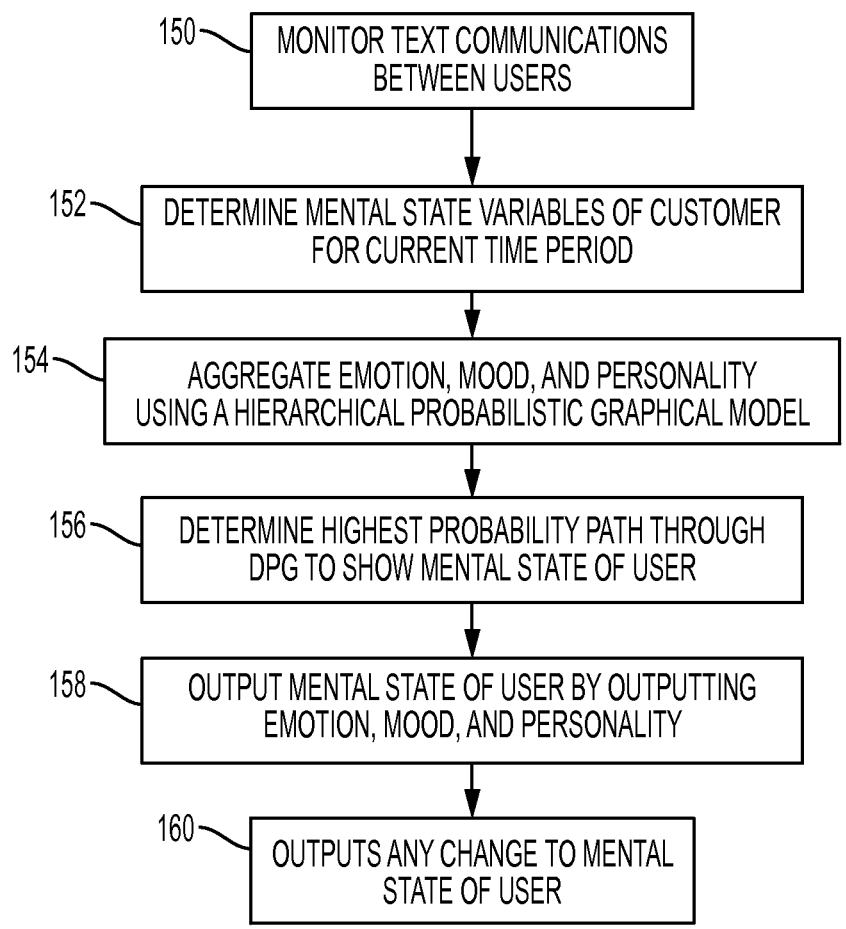
FIG. 7 is a flowchart diagram illustrating methods herein.

FIG. 7 is flowchart illustrating exemplary methods herein. In item 150, these methods automatically monitor text and/or speech communications between users (e.g., using a specialized language processor). Thus, the communications between the users that is monitored includes, but is not limited to, evidence that can be extracted from actual text of a dialog, speech signal, or features from a speech signal of a given dialog, etc. Such methods then automatically analyze the text communications using the specialized language processor to simultaneously determine, for a current time period, mental state variables of the user, as shown in item 152. These mental state variables can include the emotion, mood, and personality of the user.

These methods then automatically aggregate the emotion, mood, and personality using a hierarchical probabilistic graphical model (e.g., a directed probabilistic graph (DPG)) as shown in item 154. When aggregating the emotion, mood, and personality in item 154, these methods can, for example, maintain a single state for personality for the time period, and can maintain multiple states for the emotion and the mood for the time period as shown in item. Thus, if personality is known accurately, it is just one value across the interaction. However, if there is no prior knowledge of personality, and is made as a decision at one point in the dialogue, the methods herein may revise this value at a later stage. This does not however mean multiple personality nodes, it means the first value for the node was incorrect, so it was overwritten.

For example, the directed probabilistic graph can include a single personality node, multiple mood nodes, multiple emotion nodes, and multiple evidence nodes. Each of the mood nodes, the emotion nodes, and the evidence nodes can be for a different time portion of the time period. The evidence nodes can include different dialogue variables used by the personality node, the mood nodes, and the emotion nodes. The emotion nodes can be, for example, happy-for-satisfaction, anger, or distressed states; the mood nodes can be, for example, positive, neutral, or negative; and the personality nodes can be, for example, neuroticism, extraversion, openness to experience, agreeableness, or conscientiousness.

The directed probabilistic graph has edges connecting the personality node, the mood nodes, the emotion nodes, and the evidence nodes; and the edges themselves have probability values. Therefore, as shown in item 156, these methods also determine the highest probability path through the directed probabilistic graph to infer the mental state of the user. When processing the paths through the directed probabilistic graph in item 156, these methods aggregate the probabilities of the edges of the series of adjacent nodes, and the highest probability path is the path that has an aggregation of the probabilities of the edges that is higher than all other possible paths through the directed probabilistic graph.

As seen in item 158, using the specialized language processor, the methods output the mental state of the user from the specialized language processor by displaying the emotion, mood, and personality on the graphic user interface of the processor, or by providing the mental state to a separate process, such as a virtual agent. As shown in item 160, these methods can also outputs any change in the variable mental state of the user as the conversation progresses.

The hardware described herein plays a significant part in permitting the foregoing methods to be performed, rather than function solely as a mechanism for permitting a solution to be achieved more quickly, (i.e., through the utilization of a computer for performing calculations). As would be understood by one ordinarily skilled in the art, the processes described herein cannot be performed by human alone (or one operating with a pen and a pad of paper) and instead such processes can only be performed by a machine. Specifically, processes such as automatically monitoring text communications between users using a specialized language processor, automatically analyzing the text communications using the specialized language processor to simultaneously determine, for a current time period, mental state variables of a user, automatically aggregating the emotion, mood, and personality using a hierarchical probabilistic graphical model to determine the highest probability path through a directed probabilistic graph to infer the mental state of the user use different specialized machines and cannot be performed by humans alone.

Additionally, the methods herein solve many highly complex technological problems. For example, as mentioned above, it is difficult for automated or real customer service agents to know the mental state of the individual with which they are conducting a text chat. Therefore, the systems and methods herein provide the ability determine the mental state of a user and display the mental state or output the mental state to another process, such as a virtual agent.

Figure 8:
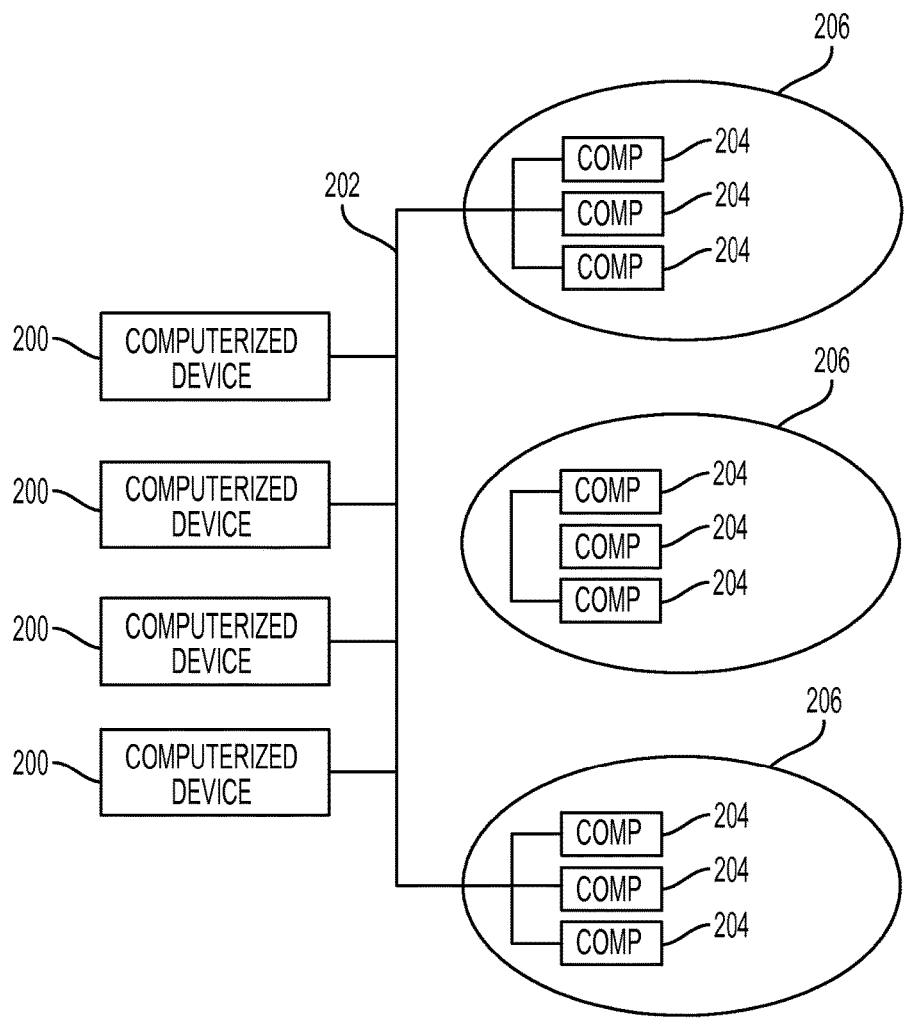
FIG. 8 is a schematic diagram illustrating a system herein.

As shown in FIG. 8, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 9:
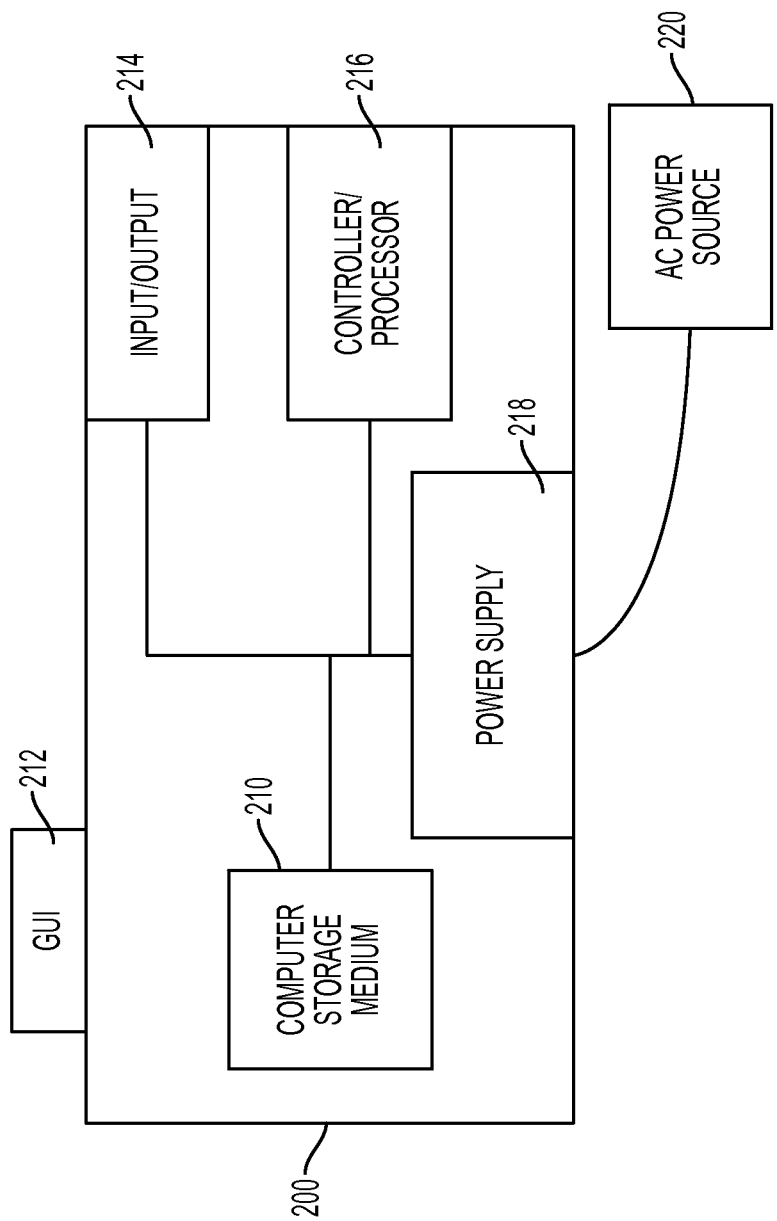
FIG. 9 is a schematic diagram illustrating devices herein.

FIG. 9 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 9, a body housing has one or more functional components that operate on power supplied from an alternating current (AC) source 220 by the power supply 218. The power supply 218 can comprise a common power conversion unit, power storage element (e.g., a battery, etc), etc.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:

automatically monitoring communications using a specialized language processor, said communications comprising computerized text forming a conversation conducted between at least two conversation partners, said conversation partners comprising an agent using a specialized language processor and a user, said conversation comprising multiple turns of text utterances exchanged between said conversation partners relating to a specific issue;

automatically analyzing said communications using said specialized language processor to simultaneously determine, for said conversation, mental state variables of said user, said mental state variables comprising:
an emotion of said user;
a mood of said user; and
a personality of said user; and automatically aggregating said emotion, said mood, and said personality using a hierarchical probabilistic graphical model that determines a highest probability path through a directed probabilistic graph to infer said mental state of said user, using said specialized language processor, said directed probabilistic graph comprising a single personality node that maintains a single unchanging state, multiple mood nodes, multiple emotion nodes, and multiple evidence nodes, and each of said mood nodes, said emotion nodes, and said evidence nodes being for a different time portion of said conversation;

automatically and constantly updating said mental state of said user output from said specialized language processor during said conversation by maintaining, in said directed probabilistic graph, a single unchanging state for said personality for all of said conversation, and maintaining multiple changing states for said emotion and said mood as said conversation progresses to track said mental state of said user during said conversation;

automatically and constantly updating said mental state of said user output from said specialized language processor as said specialized language processor tracks said mental state of said user during said conversation; and automatically and constantly displaying said mental state to said agent through a graphic user interface as said mental state is constantly updated during said conversation.

2. The method according to claim 1, said directed probabilistic graph comprising edges connecting said personality node, said mood nodes, said emotion nodes, and said evidence nodes, and said edges comprising probability values.

3. The method according to claim 2, a path through said directed probabilistic graph comprising a series of adjacent nodes, a probability of said path comprising an aggregation of said probabilities of said edges of said series of adjacent nodes, and said highest probability path having an aggregation of said probabilities of said edges that is higher than all other possible paths through said directed probabilistic graph.

4. The method according to claim 1, said evidence nodes comprising different dialogue variables used by said personality node, said mood nodes, and said emotion nodes.

5. The method according to claim 1, said emotion comprising happy-for-satisfaction, anger, or distress, said mood comprising positive, neutral, or negative, and said personality comprising neuroticism, extraversion, openness to experience, agreeableness, or conscientiousness.

6. The method according to claim 1, said single personality node being stable over said conversation, said multiple mood nodes having short term temporal stability over said conversation, and said multiple emotion nodes having instantaneous temporal stability over said conversation.

7. A method comprising:

automatically monitoring communications using a specialized language processor, said communications comprising computerized text forming a conversation conducted between at least two conversation partners, said conversation partners comprising an agent using a specialized language processor and a user, said conversation comprising multiple turns of text utterances exchanged between said conversation partners relating to a specific issue;

automatically analyzing said text utterances using said specialized language processor to simultaneously determine, for said conversation, mental state variables of said user, said mental state variables comprising:
an emotion of said user;
a mood of said user; and
a personality of said user; and automatically aggregating said emotion, said mood, and said personality using a hierarchical probabilistic graphical model that determines a highest probability path through a directed probabilistic graph to infer said mental state of said user, using said specialized language processor, said directed probabilistic graph comprising a single personality node that maintains a single unchanging state, multiple mood nodes, multiple emotion nodes, and multiple evidence nodes, and each of said mood nodes, said emotion nodes, and said evidence nodes being for a different time portion of said conversation; and automatically and constantly updating said mental state of said user output from said specialized language processor during said conversation by maintaining, in said directed probabilistic graph, a single unchanging state for said personality for all of said conversation, and maintaining multiple changing states for said emotion and said mood as said conversation progresses to track said mental state of said user during said conversation; and automatically and constantly updating said mental state of said user through said graphic user interface as said specialized language processor tracks said mental state of said user during said conversation; and automatically and constantly displaying said mental state to said agent through a graphic user interface as said mental state is constantly updated during said conversation by displaying said emotion, said mood, and said personality on said graphic user interface.

8. The method according to claim 7, said directed probabilistic graph comprising edges connecting said personality node, said mood nodes, said emotion nodes, and said evidence nodes, and said edges comprising probability values.

9. The method according to claim 8, a path through said directed probabilistic graph comprising a series of adjacent nodes, a probability of said path comprising an aggregation of said probabilities of said edges of said series of adjacent nodes, and said highest probability path having an aggregation of said probabilities of said edges that is higher than all other possible paths through said directed probabilistic graph.

10. The method according to claim 7, said evidence nodes comprising different dialogue variables used by said personality node, said mood nodes, and said emotion nodes.

11. The method according to claim 7, said emotion comprising happy-for-satisfaction, anger, or distress, said mood comprising positive, neutral, or negative, and said personality comprising neuroticism, extraversion, openness to experience, agreeableness, or conscientiousness.

12. The method according to claim 7, said single personality node being stable over said conversation, said multiple mood nodes having short term temporal stability over said conversation, and said multiple emotion nodes having instantaneous temporal stability over said conversation.

13. A system comprising:
a specialized language processor; and
a graphic user interface operatively connected to said specialized language processor,
said specialized language processor automatically monitoring communications, said communications comprising computerized text forming a conversation conducted between at least two conversation partners, said conversation partners comprising an agent using a specialized language processor and a user, said conversation comprising multiple turns of text utterances exchanged between said conversation partners relating to a specific issue;

said specialized language processor automatically analyzing said communications to simultaneously determine, for said conversation, mental state variables of said user, said mental state variables comprising:
an emotion of said user;
a mood of said user; and
a personality of said user; and
said specialized language processor automatically aggregating said emotion, said mood, and said personality using a hierarchical probabilistic graphical model that determines a highest probability path through a directed probabilistic graph to infer said mental state of said user,
said directed probabilistic graph comprising a single personality node that maintains a single unchanging state, multiple mood nodes, multiple emotion nodes, and multiple evidence nodes,
each of said mood nodes, said emotion nodes, and said evidence nodes being for a different time portion of said conversation,
said specialized language processor automatically and constantly updating said mental state of said user during said conversation by maintaining, in said directed probabilistic graph, a single unchanging state for said personality for all of said conversation, and maintaining multiple changing states for said emotion and said mood as said conversation progresses to track said mental state of said user during said conversation,
said specialized language processor automatically and constantly updating said mental state of said user as said specialized language processor tracks said mental state of said user during said conversation, and
said graphic user interface automatically and constantly displaying said mental state to said agent as said mental state is constantly updated during said conversation by displaying said emotion, said mood, and said personality.

14. The system according to claim 13, said directed probabilistic graph comprising edges connecting said personality node, said mood nodes, said emotion nodes, and said evidence nodes, and
said edges comprising probability values.

15. The system according to claim 14, a path through said directed probabilistic graph comprising a series of adjacent nodes,
a probability of said path comprising an aggregation of said probabilities of said edges of said series of adjacent nodes, and
said highest probability path having an aggregation of said probabilities of said edges that is higher than all other possible paths through said directed probabilistic graph.

16. The system according to claim 14, said evidence nodes comprising different dialogue variables used by said personality node, said mood nodes, and said emotion nodes.

17. The system according to claim 13, said emotion comprising happy-for-satisfaction, anger, or distress,
said mood comprising positive, neutral, or negative, and
said personality comprising neuroticism, extraversion, openness to experience, agreeableness, or conscientiousness.

18. The system according to claim 13, said single personality node being stable over said conversation, said multiple mood nodes having short term temporal stability over said conversation, and said multiple emotion nodes having instantaneous temporal stability over said conversation.

* * * * *